United States Patent
Gammel et al.

(10) Patent No.: US 9,323,604 B2
(45) Date of Patent: Apr. 26, 2016

(54) SIGNATURE UPDATE BY CODE TRANSFORMATION

(75) Inventors: Berndt Gammel, Markt Schwaben (DE); Stefan Mangard, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1045 days.

(21) Appl. No.: 13/428,589

(22) Filed: Mar. 23, 2012

(65) Prior Publication Data

US 2012/0246452 A1    Sep. 27, 2012

(30) Foreign Application Priority Data

Mar. 23, 2011    (DE) .......................... 10 2011 006 000

(51) Int. Cl.
*G06F 11/10* (2006.01)
*G06F 11/28* (2006.01)

(52) U.S. Cl.
CPC ............ *G06F 11/1004* (2013.01); *G06F 11/28* (2013.01)

(58) Field of Classification Search
CPC ............................. G06F 11/1004; G06F 11/28
See application file for complete search history.

(56) References Cited

U.S. PATENT DOCUMENTS 5,974,529 A    10/1999    Zumkehr et al.
7,506,217 B2 *    3/2009    Borin et al. ...................... 714/51

| 2003/0059042 A1 | 3/2003 | Okeya et al. |
| 2008/0219437 A1 | 9/2008 | Ebeid |
| 2010/0172490 A1 | 7/2010 | Braun et al. |

FOREIGN PATENT DOCUMENTS

| FR | 2828304 A1 | 2/2003 |
| FR | 2942560 A1 | 8/2010 |
| WO | 0042484 A2 | 7/2000 |

OTHER PUBLICATIONS

Sugihara, Makoto; "Dynamic Control Flow Checking Technique for Reliable Microprocessors"; IEEE; 2010.*
Bernardi et al.; "A Hybrid Approach for Detection and Correction of Transient Faults in SoCs"; IEEE; 2010.*
Nahmsuk Oh et al. "Control Flow Checking by Software Signatures." Department of Electrical Engineering & Computer Science, Stanford University, CA. Technical Report, Apr. 2000. pp. i-22.
Galla, T. et al., "Control Flow Monitoring for a Time-Triggered Communication Controller," 10th European Workshop on Dependable Computing, May 1999, pp. 1-6.
Westerbaan, B., "Reversing CRC," Intrepid Blog, Posted Jul. 15, 2005, Available at: <http://blog.affien.com/archives/2005/07/15/reversing-crc/>.
Stigge, M. et al., "Reversing CRC—Theory and Practice," HU Berlin Public Report, May 2006, pp. 1-23, Humboldt University Berlin. Berlin-Adlershof, Germany.

* cited by examiner

*Primary Examiner* — Benjamin Geib
(74) *Attorney, Agent, or Firm* — Murphy, Bilak & Homiller, PLLC

(57) ABSTRACT

Embodiments described herein provide an apparatus, computer readable digital storage medium and method for producing an instruction sequence for a computation unit which can be controlled by a program which includes at least the instruction sequence.

11 Claims, 6 Drawing Sheets

Example of replacement

SIGNATURE UPDATE BY CODE TRANSFORMATION

PRIORITY CLAIM

This application claims priority to German Patent Application No. 10 2011 006 000.6 filed on 23 Mar. 2011, the content of said application incorporated herein by reference in its entirety.

BACKGROUND

The basic principle of instruction signatures is, while a program is in runtime, to sum the executed instructions in a checksum (signature) and to check them against reference values at prescribed positions. If branches occur in the program flowchart, which can be regarded as a graphical map of the program execution, it is possible to use signature updates in order to harmonize the signatures in two or more parallel paths of the program flowchart.

When a program (software) is executed on a computation unit (hardware), it is usually expected that the program is also actually executed in the manner intended by the compiler at the time of compiling. In reality, however, the execution of a program or of a code may deviate from the originally planned program execution. The responsibility for this lies with errors in the hardware, perturbing signals or else deliberate, malicious manipulations on the computation unit, for example. Errors in the hardware can be attributed to unwanted line shorts, line interruptions or hanging switching elements (what are known as "stuck-at faults"), for example, to cite a few frequently occurring types of hardware errors. Perturbing signals can arise during the operation of the computation unit, for example as a result of electromagnetic fields or else in the form of extreme temperatures which are outside of the temperature range intended for the computation unit. Malicious manipulations of the hardware can be effected by shorting selected contacts, interrupting lines or by exposing the computation unit and/or a memory connected to the computation unit to laser radiation, for example. The cited error types can occur within the computation unit itself, within a memory which stores the program, within further components of a system which comprises the computation unit, or in electrical connections between the components of the computer system, for example. In order to detect such errors during the execution of the program, instruction flow control can be performed.

For the purpose of instruction flow control, a test value (the signature), which is obtained from the instructions of the program to the computation unit, is calculated, usually during the creation of the program. By way of example, the operation codes (opcodes) of the instructions can be added in order to form a checksum in this way. In the case of a linear program, which is usually executed from the start of the program to the end of the program, including all the instructions in between, it is therefore possible to calculate a single checksum (or more generally a test value) which can be checked at the end of the program or after the end of the program. For this check, in parallel with the execution of each instruction by the computation unit, the value of this instruction (for example in the form of the opcode available as a bit pattern) is set against the content of a specific register, e.g. is added to the register content or is Exclusive-Ored (XOR) with the register content on a bit-by-bit basis. As soon as all the instruction values have been taken into account in the specific register in this manner, the resulting value from the specific register can be compared with a reference test value in order to establish whether there is a match between the two values. If there is a match, proper execution of the program can usually be assumed, i.e. the program has actually been executed in the manner planned at the time of creation of the program. By way of example, the reference test value may be stored as a constant in the program code. Depending on how and with which programming language the program has been created, the reference test value can be calculated by a compiler and written into the program code.

Frequently, programs have branches in the program flow, which can also be regarded as "conditional jumps". Following a branch, the program can be continued on at least two paths, the decision about which of the two or more possible paths is chosen being obtained only when the program is in runtime by virtue of the evaluation of a condition. It should be noted that branch points having more than two possible branch paths can normally be broken down into elemental branch points, i.e. into branch points which each have only two possible branch paths. For the value which is calculated while the program is in runtime, this means that it is dependent on which paths have been taken how often. So that, toward the end of the program, for example, or at another point within the program execution, a comparison can be performed between the current test value and a reference test value defined for this point, it is possible for the test values within the different paths which can be taken to be oriented to one another. This may take the form that the compiler incorporates into one path one or more instruction(s) which is (are) superfluous to the program execution per se and which alter(s) the test value such that said path has, at a merged point with another path, the same test value as this other path. Typically, there is then provision for specific updates to be recognized from particular bit patterns and to be filtered out of the normal instruction flow in order to be used for the update in a specific way.

SUMMARY

Exemplary embodiments of the present invention provide a method for producing an instruction sequence for a computation unit which can be controlled by a program which comprises at least the instruction sequence. Exemplary embodiments of the present invention also provide a method for executing a program on a program controlled computation unit, wherein the program comprises at least one instruction sequence which has been produced by the first-mentioned method. Further exemplary embodiments of the present invention provide a computer program having a program code for carrying out the first-mentioned method and a compiler for creating a computer program which applies the method for producing an instruction sequence.

On the basis of what has been said above, the technical teaching disclosed herein relates to a method for performing implicit signature updates using code transformation for instruction signature methods.

Exemplary embodiments of the technical teaching disclosed herein provide a method for producing an instruction sequence for a computation unit which can be controlled by a program which comprises at least the instruction sequence. In this case, when the program is in runtime, a signature module, for example, calculates signature values on the basis of the instruction executed by the computation unit and compares them with reference values. The method comprises: determining a target signature value; determining an initial instruction sequence for a program section which leads to a program point, wherein the execution of the initial instruction sequence starting from a start signature value results in the calculation of an initial signature value which is different than the target signature value; and determining a modification to the initial instruction sequence in order to obtain a modified instruction sequence. The effect achieved by the determination of the modified instruction sequence is that the execution of the modified instruction sequence results in the calculation of the target signature value. A result of processing of useful data by the modified instruction sequence corresponds to a result of processing over the useful data by the initial instruction sequence at the program point, wherein all the instructions in the modified instruction sequence are used in the signature calculation using the same method.

On the basis of the method according to the disclosed technical teaching, it is therefore possible to dispense with explicit instructions for the signature update, since the signature update is performed inherently by the modified instruction sequence. In connection with a signature module, it is therefore possible to dispense with explicit write access operations to the signature register of the signature module, which are used in some instruction signature methods in order to bring the signature in one program path into line with the signature in a parallel program path. The signature calculation at runtime handles all instructions equally, i.e. all instructions are used in the signature calculation using the same method or the same calculation specification. Therefore, the instructions provided for the signature update do not need to be filtered out at runtime. At least some instructions in the modified instruction sequence adopt a dual function anyway, namely the processing of the useful data and the updating of the signature in the intended manner, so that it would make no sense to distinguish these instructions according to normal instructions and update instructions. On the basis of the teaching disclosed herein, explicit instructions for the signature update are not necessary, even though they continue to be possible nevertheless.

The proposed type of signature update therefore differs from other methods of signature update in which an update command is used in the signature calculation in another way, e.g. by explicitly adding a particular value to the present signature value. For this purpose, signature modules which support such other methods of signature update typically have at least two interfaces: a first interface is used to supply the signature module with the operation codes of normal instructions, which are therefore used in the normal signature calculation. A second interface is used to transmit the explicit update instructions to the signature module. These explicit update instructions are typically not included in the hash sum as well, that is to say are not used in the normal signature calculation. On the basis of the disclosed technical teaching, a signature module does not necessarily need to have the second interface. Similarly, it is not necessary for the signature module to distinguish between "normal" instructions and update instructions.

On the basis of the disclosed teaching, it is possible, by way of example, for all instructions or values to be taken into account ("co-hashed") for a hash value calculation, or an entire command is added (instead of just the argument which is specified in an addition command).

The start signature value is associated with a point at the start or in front of the instruction sequence. The signature calculation reshapes this start signature value to form an end signature value which is associated with a point at the end of the instruction sequence or with a point after said instruction sequence. The initial signature value is the value at the end of the initial instruction sequence (or at a point thereafter), which value is obtained from the initial instruction sequence. The target signature value is the value at the end of the modified instruction sequence.

By way of example, the modification of the instruction sequence may also involve unused bits in a command being changed in order to change the signature. This allows bits in the signature to be changed in a specific way.

In exemplary embodiments, the determination of the modification may comprise changing the order of two or more instructions, may comprise inserting an instruction, may comprise replacing an instruction and/or may comprise splitting an instruction into two or more instruction parts.

In further exemplary embodiments, the determination of the modification may comprise assigning a constant value to a register or a memory element (memory address) in the computation unit without the constant value being used for processing the useful data following the assignment. Typically, the register or the memory element to which the constant value is written is not the signature register, but rather is a register or memory element provided for useful data.

In addition, the determination of the modification may comprise: comparing the difference with at least one signature modification value for at least one modification option; selecting a modification option; determining a residual difference; and, if the residual difference is not equal to zero: repeating the steps of comparing, selecting and determining the residual difference. By iteratively performing a plurality of modifications to the initial instruction sequence, it is also possible to achieve target signature values for the signature which are not able to be produced with a single modification. The initial instruction sequence may sometimes have few degrees of freedom, which means that a suitable modification is possibly difficult to find.

According to further exemplary embodiments, the determination of the modification may comprise selecting a chosen modification option from a multiplicity of modification options, wherein the instruction sequence modified according to the chosen modification option has lower additional processing complexity vis-à-vis the initial instruction sequence than other modification options. By evaluating a cost function for the computation complexity, it is possible to filter out modification options which achieve the desired signature update with as little additional computation complexity as possible for the computation unit.

The selection of the chosen modification option may also comprise querying a database which stores modification specifications for the multiplicity of the modification options which can be used to ascertain the multiplicity of the modification options for the program section. The modification specifications can also specify conditions to be met which indicate whether and in what way a particular instruction or group of instructions can be modified. This evaluation may involve a data dependency analysis, in particular.

According to further exemplary embodiments, the determination of the target instruction value may comprise ascertaining an instruction value for an alternative program path to the program point as compared with the program section.

The determination of the modification may also comprise: identifying a splittable instruction in the program section, breaking down an argument from the splittable instruction into at least two argument parts, and replacing the splittable instruction with at least two instruction parts, each having one of the at least two argument parts.

According to further exemplary embodiments, the determination of the modification to the initial instruction sequence may involve an attempt to determine a modification which does not prompt an extension to the instruction sequence. If such a modification cannot be found (with reasonable effort), the method may have at least one of the following actions: determination of a modification which prompts an extension to the instruction sequence; insertion of an instruction for an explicit code update; and changing of the target signature value and/or of the initial signature.

In respect of the "changing of the target signature value and/or of the initial signature" option, the desired target signature may be an additional constraint for the optimization, so to speak. The possibility of changing the target signature value and/or the initial signature provides an additional degree of freedom for the modification. Changing the target signature value and/or the initial signature can sometimes mean that the instruction sequence also needs to be modified in a parallel program path.

Alternative exemplary embodiments of the invention provide a method for executing a program on a program controlled computation unit, wherein the method comprises at least one instruction sequence which has been produced by the method for producing an instruction sequence for a computation unit. During the execution of the program, there is typically a signature calculation for each signature executed by the computation unit and, at positions provided for this purpose in the program flow of the program, there is a check on the signature value calculated at runtime with a reference value. Since there are not explicit instructions for updating the signature register or value, malicious manipulations on the signature register, for example, are more difficult for a potential attacker to perform.

A further exemplary embodiment of the disclosed technical teaching provides a computer program having a program code for carrying out the above-described method for producing an instruction sequence when the computer program is executed on a computer.

A further exemplary embodiment of the disclosed technical teaching provides a compiler for creating such a computer program.

A further exemplary embodiment provides an apparatus for producing an instruction sequence for a computation unit which can be controlled by a program which comprises at least the instruction sequence. When a program is in runtime, signature values are calculated on the basis of the executed instructions and are compared with reference values. The apparatus comprises: a target signature determination unit for determining a target signature value; an instruction sequence determination unit for determining an initial instruction sequence for a program section which leads to the program point; a signature ascertainment unit for ascertaining an initial signature value, which is associated with the program point, on the basis of the initial instruction sequence; and a modification determination unit for determining a modification to the initial instruction sequence in order to obtain a modified instruction sequence. The execution of the modified instruction sequence results in the calculation of the target signature value, and a result of processing of useful data by the modified instruction sequence corresponds to a result of processing of the useful data by the initial instruction sequence at the program point, wherein the modification to the initial instruction sequence results in a different chronology for the execution of instructions which relate to useful data within the program section.

In previous instruction signature methods, the signature updates are performed by explicit instructions or explicit memory access operations. This entails additional complexity for executing the program. Sometimes, even architectural changes in a system are necessary in order to support explicit update instructions or explicit registers.

According to the disclosed technical teaching, the program code can be transformed such that a code transformation can perform a specific (prescribed) update for the instruction signature.

Those skilled in the art will recognize additional features and advantages upon reading the following detailed description, and upon viewing the accompanying drawings.

BRIEF DESCRIPTION OF THE DRAWINGS

Exemplary embodiments of the present invention are described in more detail below with reference to the appended figures, in which.

DETAILED DESCRIPTION

Figure 1:
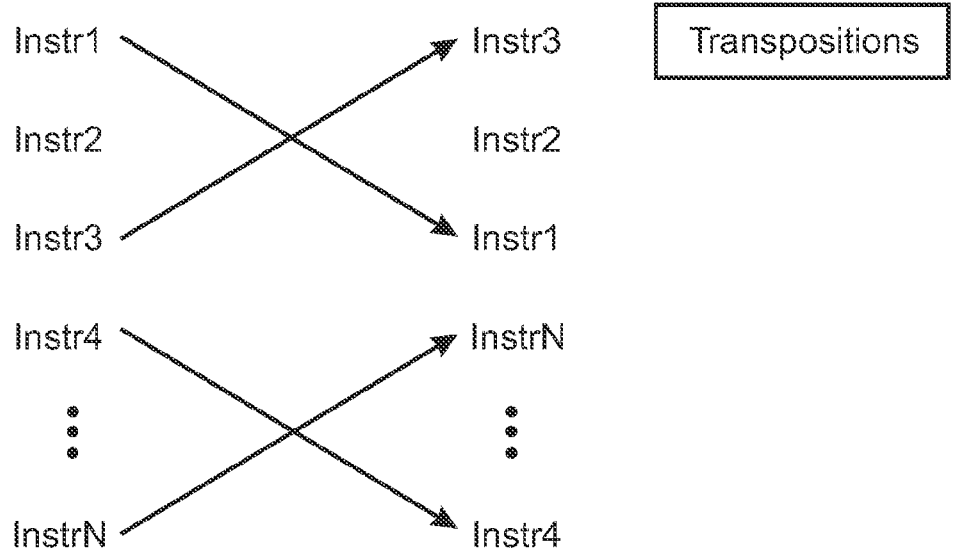
FIG. 1 shows an illustration of a code transformation using transposition.

Before exemplary embodiments are explained below with reference to the accompanying figures, elements which are the same or elements which have the same function are provided with the same or similar reference symbols and that a repeat description of these elements has been dispensed with. Descriptions of elements having the same or similar reference symbols are therefore interchangeable with one another.

In previous instruction signature methods, the updates for the signature are performed by explicit instructions or memory access operations. However, the updates can also be performed efficiently by code transformations without changing the hardware structure. In order to implement a certain function on a processor, there usually is a plurality of options. Particularly if one is prepared to allow at least one supplementary instruction (there may also be a plurality) in comparison with the optimum code, there are a large number of possibilities for writing the code. This large number can be used in order to perform an update implicitly by means of suitable choice of the program code.

By changing the program code such that the result of the program does not change, the signature can be brought to a desired target signature value at a different point than that at which the change takes place.

Finding code transformations which leave the logical function of a program untouched is well known to persons skilled in the art and does not require further explanation herein. In exemplary embodiments, an inspection flow signature method involves the specific selection of an invariant transformation from the vast quantity of possible transformations, so that the signature is transformed to a prescribed value.

Ultimately, every compiler produces different code transformations, with different but functionally identical code being produced for different optimization stages. In exemplary embodiments of the invention, one of the transformations is used which results in a desired signature.

In exemplary embodiments of the invention, transformations of the code which lead to the desired target signature may be dependent on the chosen prescribed signature algorithm, wherein for different signature algorithms different transformations can result in the target signature.

In exemplary embodiments of the invention, a start signature and a target signature are prescribed and an appropriate code transformation is sought. If the instructions are inserted, there may also be a plurality of solutions. In exemplary embodiments of the invention, however, no instructions are inserted, but rather existing instructions are transposed in order to keep down the code overhead.

Exemplary embodiments of the invention may involve changing the start signature or target signature if the available degrees of freedom for the transformation are insufficient to find a transformation which is compatible with given constraints (e.g. given code length).

In exemplary embodiments of the invention, an attempt is made to perform a transformation which is such that the transformed program code does not become longer, e.g. per elemental block (basic block), e.g. by purely transposing instructions. If such a solution is not found, exemplary embodiments may involve either a) an instruction pertaining to the explicit signature update being inserted, b) an additional operation being inserted, such as two additions instead of one addition, or c) the start signature and/or target signature being changed.

In exemplary embodiments of the invention, a modification to the initial instruction sequence may have one or more of the following transformations, this not being a conclusive list, however:

changing of an order for two or more instructions;
insertion of one or more instructions;
replacement of one or more instructions;
splitting of an instruction into two or more instruction parts;
assignment of a constant value to a register or a memory element in the computation unit without the constant value being used for processing the useful data following the assignment;
performance of a register permutation, for example by transposing the processor registers used (such as from R1, R2, R3 in R2, R1, R3 or R3, R2, R1). In this case, it is necessary to take into account that the registers in dependent or subsequent basic blocks also have the correct values, i.e. it is necessary for global matching beyond the elemental block to take place;
use of free registers, again with global analysis and matching operations beyond the elemental block being necessary;
filling of unused fields in instructions with freely chosen bits; and
performance of arithmetic sign changes for operands in the case of an addition or subtraction, and appropriate transposition of addition and subtraction.

However, it is clear to persons skilled in the art that other modifications or transformations resulting in a target signature are also possible, besides those cited.

FIG. 1 shows a first embodiment for a code transformation, which involves modifying the order of two or more instructions, i.e. altering signature values by shifting instructions. This option for modification is called "transposition" in the course of this description. The left-hand column in FIG. 1 shows the original code, in which the instructions are executed in the order Instr1, Instr2, Instr3, Instr4, . . . InstrN.

By way of example, this order has been stipulated by a compiler or a code optimizer and prompts useful data to be processed by the instructions in an intended manner. The right-hand column shows the result of two transpositions which have been performed. A first transposition involves the instructions Instr1 and Instr3 having changed places. A second transposition resulted in the instructions Instr4 and InstrN changing places. A usual requirement is that the modification of a program section is transparent vis-à-vis the processing of the useful data. This means that, following execution of a modified program section, the useful data in the result has been processed in an identical manner to the way in which this would have been promoted by the original program section. Within the modified program section, on the other hand, the processing of the useful data may differ from the processing which is performed in the course of the original program section. By way of example, the transposition makes use of the fact that the order of particular instructions can be altered without altering the processing of the useful data in the result (i.e. at the end of the modified program section).

The code transformation by means of transposition can be applied when the signature calculation is not commutative, so that changing the order of the instructions results in different signature values, that is to say when the following applies:

$$\text{Signature}(\text{Instr1}, \text{Instr2}) \neq \text{Signature}(\text{Instr2}, \text{Instr1}).$$

With regard to the useful data, the instructions Instr1 and Instr2 are typically commutative, on the other hand. This allows the signature to be influenced by altering the order of the instructions. If a large number of permutations for the order of the instructions is possible with regard to the useful data, the transposition of instructions has a large number of degrees of freedom, which means that the signature can be matched to many desired target signature values.

Figure 2:
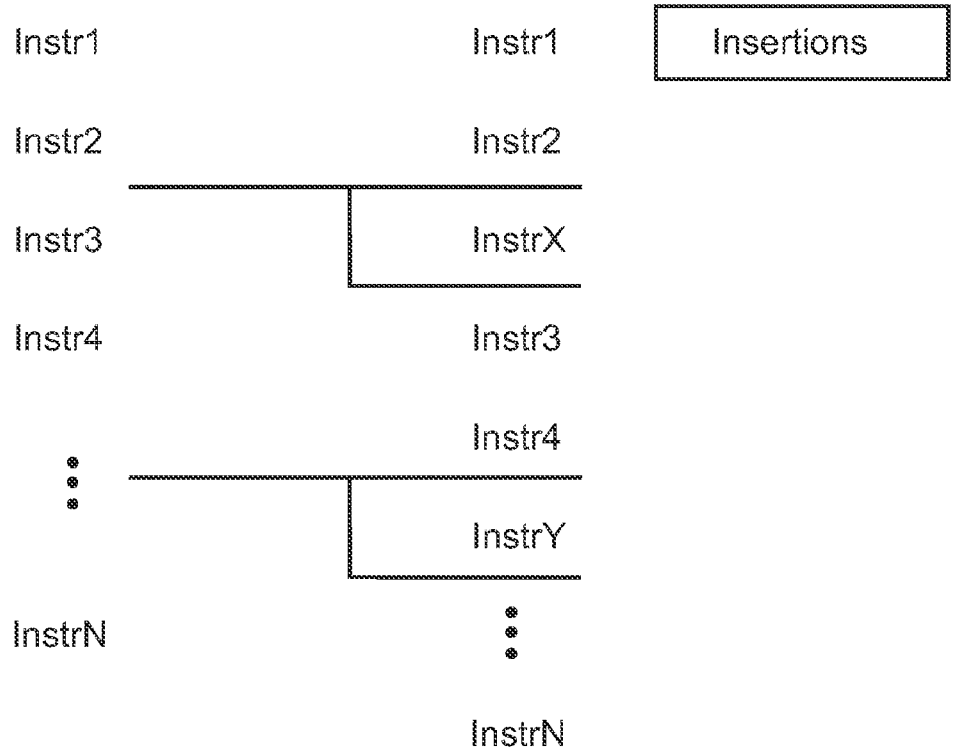
FIG. 2 shows an illustration of a code transformation using insertion.

FIG. 2 shows a second embodiment for a code transformation, which involves inserting one or more instructions which the original program code did not contain. In FIG. 2, an additional instruction InstrX is inserted between the instructions Instr2 and Instr3 of the original program codes. In addition, a further additional instruction InstrY is inserted subsequently to the instruction Instr4. By way of example, the inserted instructions InstrX and InstrY may be instructions which do not alter the useful data. These are conceivably addition of the value zero, repetition of a memory read or write operation (so that the same value is read or written twice) or loading of a particular value into a register which is unused at this time in the processor.

Figure 3:
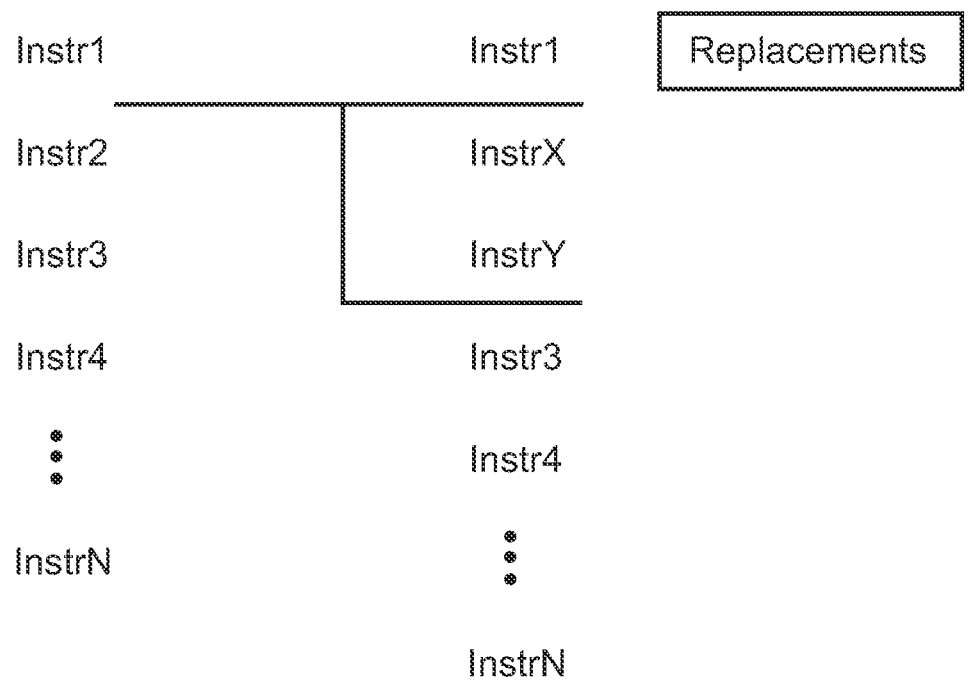
FIG. 3 shows an illustration of a code transformation using replacement.
Figure 3:

FIG. 3 shows a third embodiment for a code transformation, which involves replacing an original instruction. In FIG. 3, the original instruction Instr2 is replaced by two instructions InstrX and InstrY. The argument is broken down, so that the result remains the same but the signature retains the desired target value. As the lower portion of FIG. 3 shows, the instruction Instr2 may be addition of the constant value 2468 to the current content in the register R3, for example. This addition can be split into two addition parts, with the first addition part (InstrX) first of all involving the value 1330 being added and the second addition part (InstrY) involving the value 1138 being added. The result is that the register R3 therefore contains the value that is increased by 2468 in comparison with its previous content following execution of the two instructions InstrX and InstrY. Instead of two additions, it is also possible to perform two subtractions, a plurality of addition parts, a plurality of subtractions or a combination of addition(s) and subtraction(s). This option for the code transformation opens up wide ranging and/or flexible possibilities, since constant values can be represented by a large number of different addition and subtraction combinations. By way of example, by adding a constant value and subsequently subtracting the same value, it is possible for the value zero to be added to a register as the result, which has no effect on the outcome of the useful data processing. By contrast, such an instruction combination has an influence on the signature calculation which, for a specific choice of the constant value, can be adjusted such that a signature update can be attained which brings the signature at a particular program point to a target signature value provided that, in connection with the computation unit, while the program is in runtime, no error occurs in the processing of the instructions which are used in the signature calculation.

FIG. 3 therefore illustrates an embodiment of a code transformation in which an addition is calculated in two steps instead of in just one step. The choice of the split for the two steps allows the instruction signature to be altered (updated) such that precisely the functionality of an explicit signature update instruction is implemented.

As alternative to splitting the processing of a constant value, as shown in FIG. 3, it is also possible to process a register value or a variable in two or more steps. If the content of a first register R1 is intended to be added to the content of a second register R2, for example, the least significant bit of R1 can first of all be added to the content of R2, then the content of the first register R1 can be divided by two (generally: by n), e.g. by means of a right shift, and then can be added twice (generally: n-times) to the second register.

The modification options indicated in FIGS. 1 to 3 as an example are suitable for influencing the signature in a specific manner without directly influencing the content of a signature register in the computation unit or a connected signature module, or without one or more instruction(s) influencing the content of the signature register. Other examples are the assignment of constants to registers which are at least intermittently not used by the processor.

Figure 4:
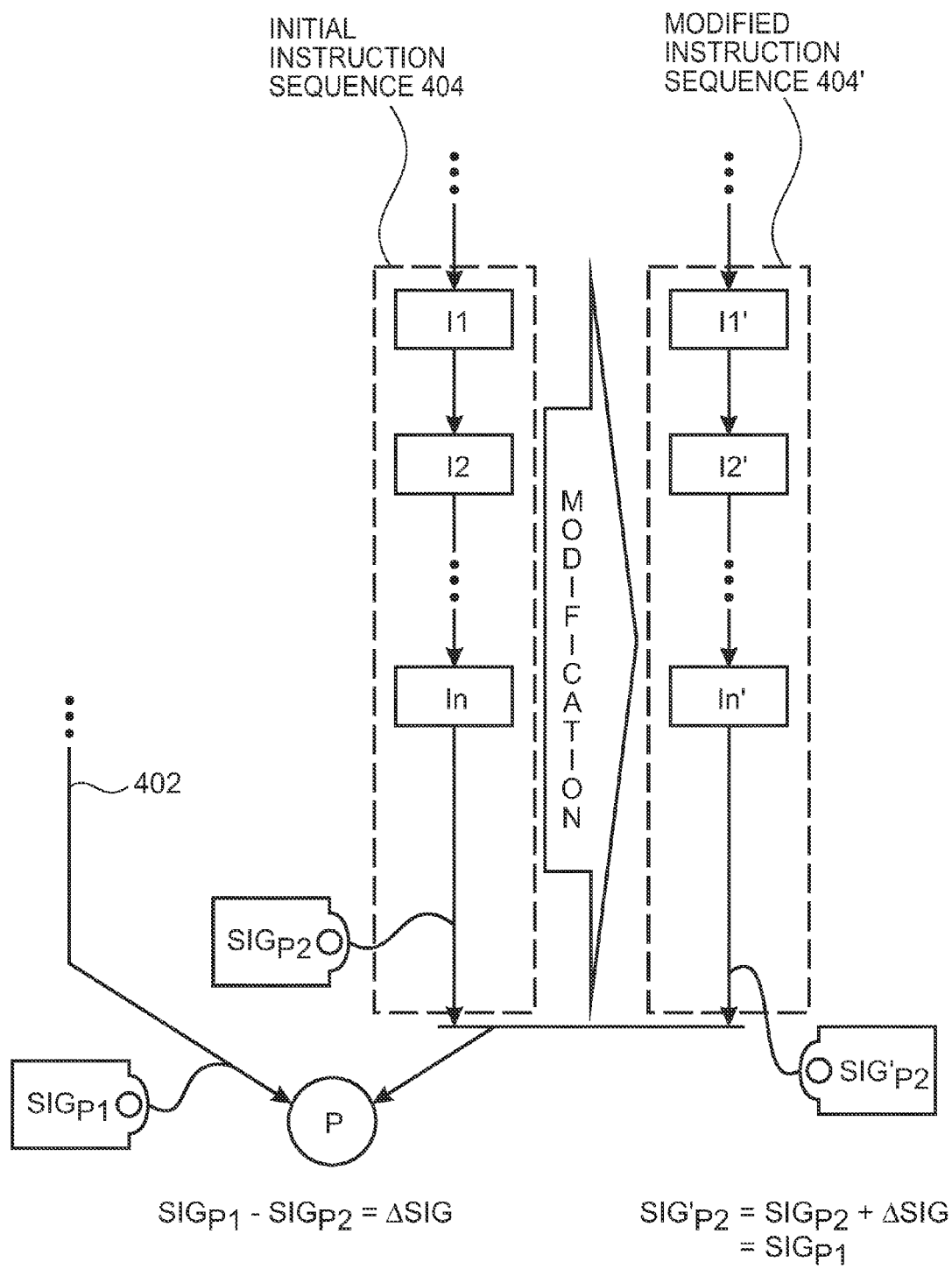
FIG. 4 shows a detail from a schematic flowchart for an initial instruction sequence and a modified instruction sequence, which can replace the initial instruction sequence.

FIG. 4 shows a detail from a program flowchart. At a program point P, two program paths or instruction sequences 402 and 404 which set out from a branch point (not shown) are recombined. At the end of the instruction sequence 402, the signature has the value $SIG_{P1}$ if the instructions have been executed correctly. By contrast, an initial version of the second instruction sequence 404 results in a signature value $SIG_{P2}$, which is generally different than the signature value $SIG_{P1}$ by a difference $\Delta SIG = SIG_{P1} - SIG_{P2}$. Before the two instruction sequences 402 and 404 are combined at the point P, it is usually desirable for the signatures in the different merging instruction sequences 402 and 404 to have the same signature value, provided that the instructions in the instruction sequences have been executed without error. For this purpose, the signature in one of the two instruction sequences 404, 402 is matched to the signature in the other instruction sequence 402, 404. In FIG. 4, the second instruction sequence 404 is matched, so that a modified instruction sequence 404' is obtained from the initial instruction sequence 404. The modified instruction sequence 404' has a modified signature value $SIG_{P2}'$ at the program point P, the modified signature value matching the signature value $SIG_{P1}$ at the first instruction sequence 402. The following is true: $SIG_{P2}' = SIG_{P2} + \Delta SIG = SIG_{P1}$. In this way, the signature calculation and checking can be continued at program point P, following the combination of the instruction sequences 402, 404', without it being significant to the signature calculation whether the first instruction sequence 402 or the (modified) second instruction sequence 404' has been executed by the computation unit.

Within the framework of the modified instruction sequence 404', it is possible to match the signature to the signature of the instruction sequence 402 by means of an explicit signature update. According to the technical teaching disclosed herein, however, the instruction sequence 404 is modified, as a result of which at least some of the original instructions I1, I2, and In are modified. The modified instruction sequence 404' therefore has modified instructions I1', I2' and In', for example. The modification of the instructions may involve shifting, omitting, adding, replacing or changing instructions. In particular, the chronology of the processing of data within the initial instruction sequence 404 differs from that which is performed within the modified instruction sequence 404'. A difference in the chronology is also caused by a zero addition, for example, being inserted at a particular position in the modified instruction sequence 404', since this means that the subsequent instructions are executed at least one clock cycle later.

The useful data from a program or from a program section should typically include at least such data as represent an input, output or auxiliary variable for the program or program section, i.e. data which influence an output or an outcome from the program or program section. Depending on the definition, the useful data may furthermore also include data which are processed by the processor but which do not influence the output of the program or program section. By way of example, the latter data could be data which are written to a register in the computation unit or are read from said register but which do not interact with input variables, or auxiliary variables and/or output variables from the program or program section.

Figure 5:
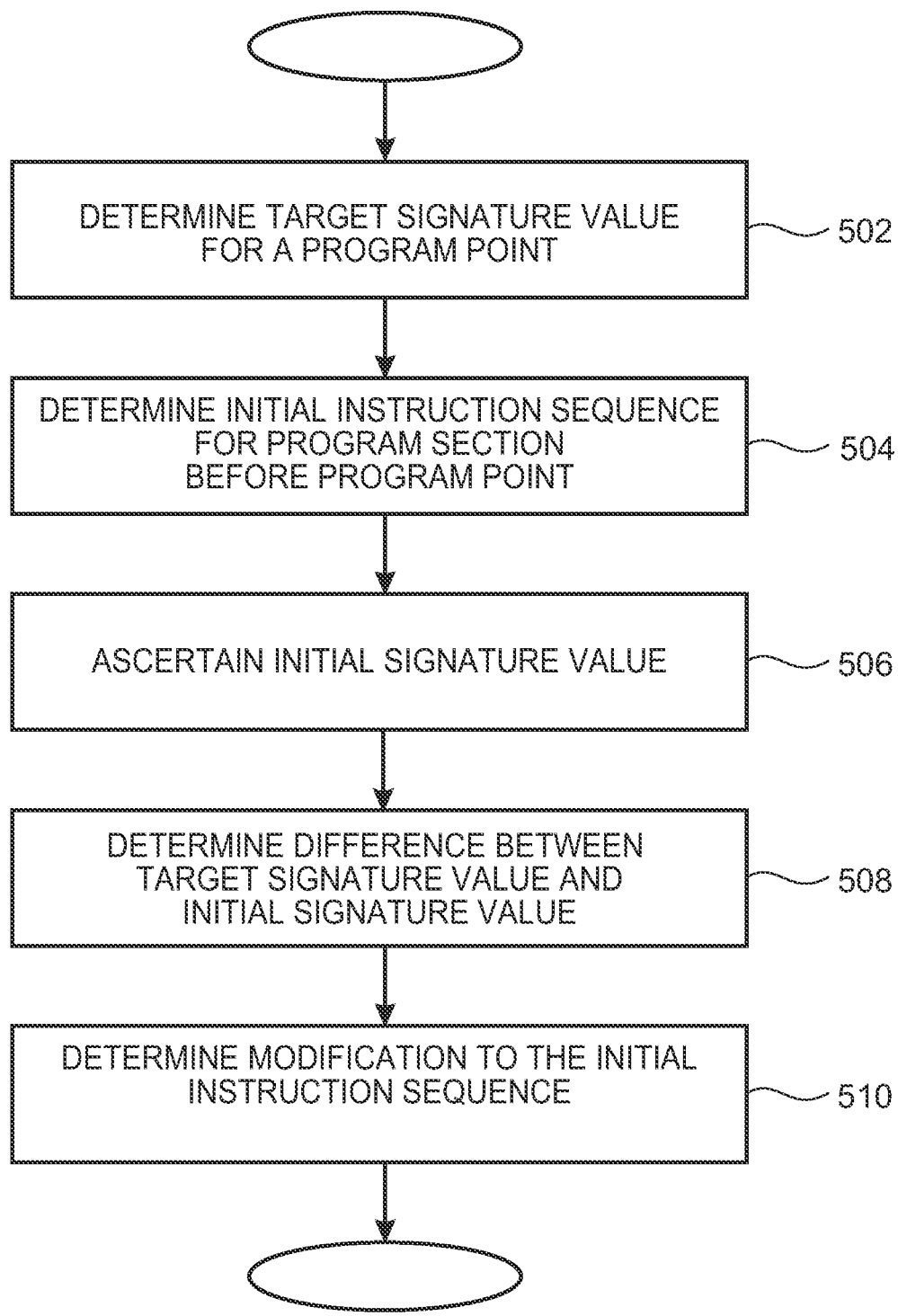
FIG. 5 shows a flowchart of a method of producing an instruction sequence according to an exemplary embodiment.

FIG. 5 shows a schematic flowchart of a method of producing an instruction sequence for a computation unit according to an exemplary embodiment.

Action 502 involves a target signature value being determined for a program point P. By way of example, the target signature value can be obtained from the reference signature—calculated as standard—of another program path which leads to the program point P.

At 504, an initial instruction sequence is determined for a program section which leads to the program point P. Usually, the program section opens into the program point P, although deviations from this are possible, i.e. the program section ends even before the program point P. The initial instruction sequence can be determined by a compiler, for example. Within the framework of the method disclosed herein for producing an instruction sequence, the initial instruction sequence can also be read from a file or data storage medium, for example.

As an optional action, an initial signature value can be ascertained at 506 on the basis of the instructions in the initial instruction sequence. It is likewise optional for a difference between the target signature value and the initial signature value to be determined at 508. By determining the difference, it is sometimes possible to facilitate a search for possible modification options. By way of example, the difference can be used as an argument in a function which is used to calculate a constant value which is written to a currently unused register in the computation unit. This register write operation can then prompt a change to the signature which corresponds precisely to the required difference in the signature.

In the course of the action 510, a modification to the initial instruction sequence 404 is then determined which results in the modified instruction sequence 404'.

Figure 6:
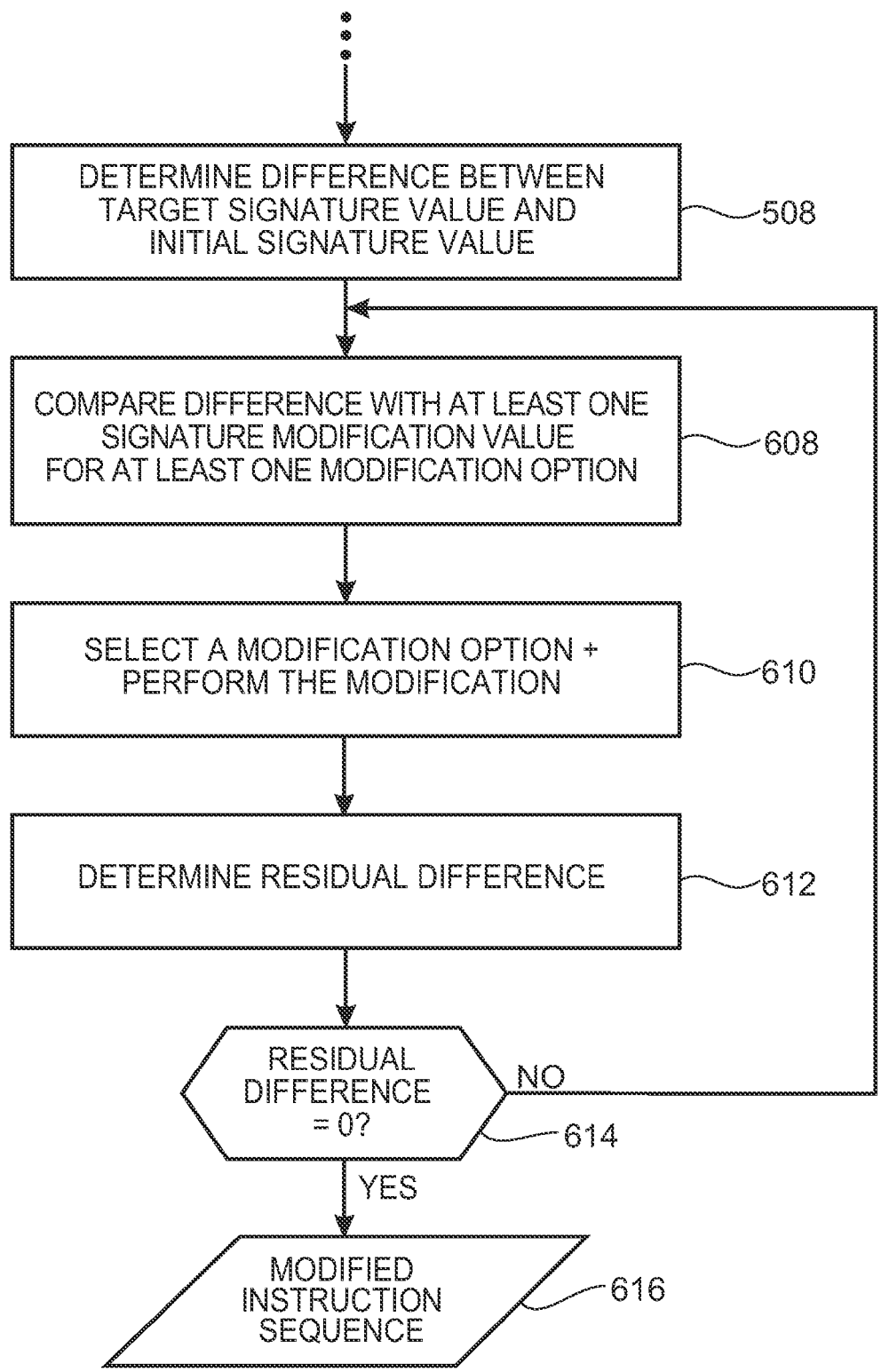
FIG. 6 shows a flowchart for a detail from the method of producing an instruction sequence according to a further exemplary embodiment.

FIG. 6 shows a schematic flowchart which shows an aspect of a method of producing an instruction sequence. Starting from the action 508, in which the difference between the target signature value and the initial signature value is determined, the difference is compared with at least one signature modification value for a modification option at 608. At 610, a modification option is selected and the relevant modification to the instruction sequence is performed. If the signature modification value for the chosen modification option matches the determined difference, the aim of the modification has been achieved. This is established by determining a residual difference at 612 and comparing this residual difference with zero at 614. If the residual difference is equal to zero, the method ends with the output of the modified instruction sequence 616. If, by contrast, the residual difference is not equal to zero, the method returns from the test 614 to the action 608, where the residual difference is compared with the signature modification values for one or more modification options. In this way, multiple iterations can be performed until the residual difference is equal to zero. Upon each iteration, a further modification option is performed which is irrelevant, that is to say "transparent", for the processing of the useful data as a result, however.

Usually, the aim for the method will be to require as few modifications as possible for the initial instruction sequence, since in this way the additional complexity for the computation unit which is frequently caused by the modification can be kept within reasonable limits. Whereas transpositions, as are shown in FIG. 1, sometimes produce no increase in the computation complexity at all, insertions of instructions can increase the computation complexity. Different modification options are thus associated with different effects on the computation complexity. This information can be stored together with the modification options, so that the decision in favor of a specific modification option can take account of a possible increase in the computation complexity. A possible strategy for choosing the modification option(s) could therefore be to check possible transpositions of instructions first of all. Only if it is found that the target signature value of the signature cannot be achieved exclusively with transpositions would it be possible to sidestep to other modification options such as insertions and/or replacements.

Figure 7:
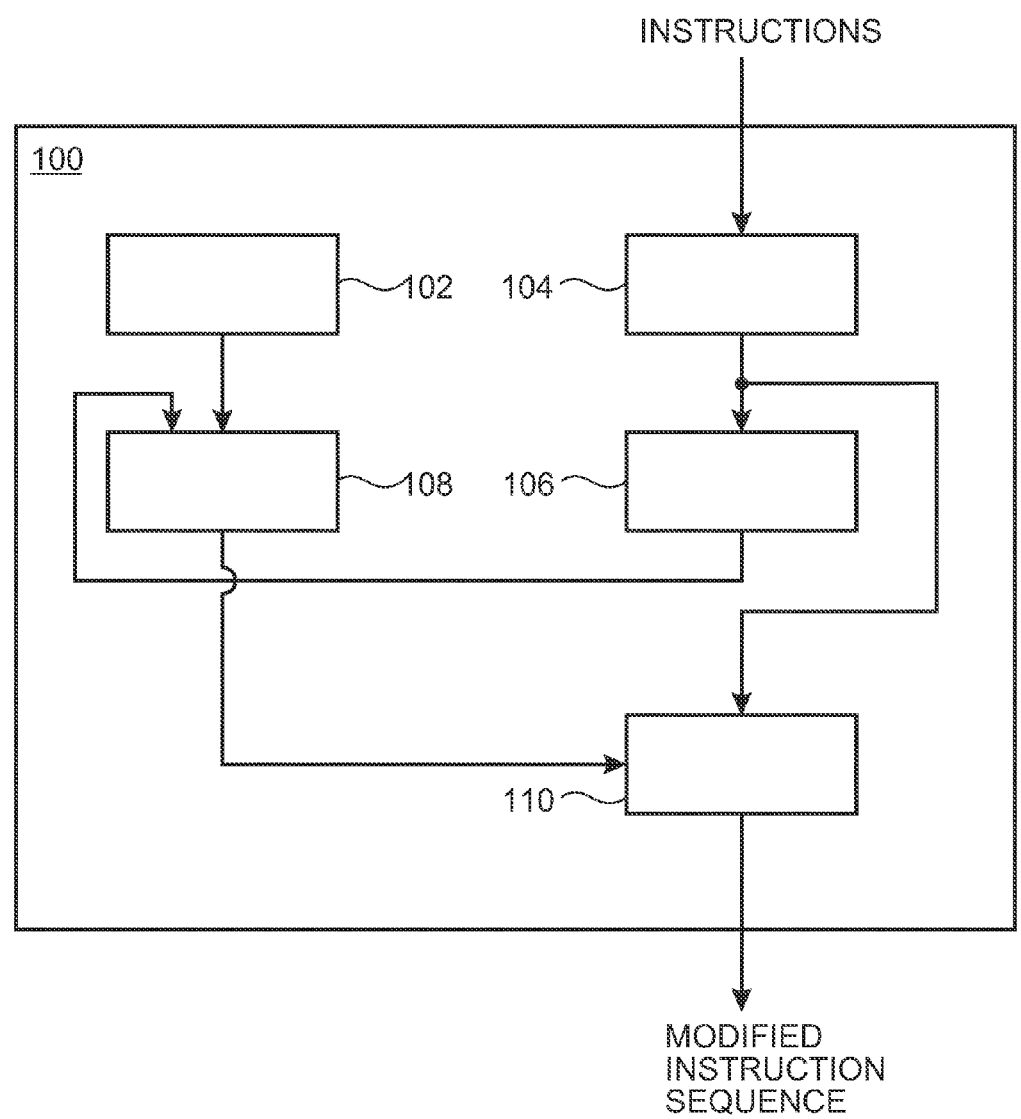
FIG. 7 shows a schematic block diagram of an apparatus for producing an instruction sequence for a computation unit according to an exemplary embodiment.

FIG. 7 shows a schematic block diagram of an apparatus 100 for producing an instruction sequence for a computation unit according to the technical teaching disclosed herein. By way of example, the apparatus 100 receives instructions from a compiler as an input quantity. These instructions are usually in the form of an initial instruction sequence. The apparatus 100 comprises an instruction sequence determination unit 104 which determines the initial instruction sequence or makes it available to the apparatus 100 by reading a file or by comparable actions.

The apparatus 100 also comprises a target signature value determination unit 102. By way of example, the target signature value determination unit 102 may be designed to identify program points at which two or more parallel program paths are brought back together. At these program points, provision is typically made for a signature update to be performed in some of the program paths so that the signatures in the different signature paths correspond to one another at said program point. The target signature value determination unit 102 can stipulate one of the program paths, which can serve as a reference path for the purposes of the signature determination. Typically, no signature update is performed in the reference path, although this is not out of the question. By contrast, the other program path or the other program paths typically has (have) provision for a signature update.

A signature ascertainment unit 106 is designed to ascertain an initial signature for and on the basis of the initial instruction sequence. The ascertained initial signature is transmitted to a difference determination unit 108 which receives the target signature value as a further input variable. An ascertained difference between the target signature value and the initial signature is forwarded to a modification determination unit 110, which also receives the initial instruction sequence from the instruction sequence determination unit 104. The modification determination unit 110 outputs a modified instruction sequence which also represents an output from the apparatus for producing the instruction sequence.

Although some aspects have been described in connection with an apparatus, these aspects are also a description of the corresponding method, which means that a block or an element of an apparatus can also be understood to be a corresponding method step or to be a feature of a method step. Similarly, aspects which have been described in connection with or as a method step are also a description of a corresponding block or detail or feature of a corresponding apparatus. Some or all of the method steps can be executed by a hardware unit (or using a hardware unit), such as a microprocessor, a programmable computer or an electronic circuit. In some exemplary embodiments, some or a plurality of the most important method steps can be executed by such a unit.

According to particular implementation requirements, exemplary embodiments of the invention may be implemented in hardware or in software. The implementation can be performed using a digital storage medium, for example a floppy disk, a DVD, a Blu ray disk, a CD, a ROM, a PROM, an EPROM, an EEPROM or a FLASH memory, a hard disk or another magnetic or optical memory, which stores electronically readable control signals which interact or can interact with a programmable computer system such that the respective method is performed. Therefore, the digital storage medium may be computer readable.

Some exemplary embodiments according to the invention thus comprise a data storage medium which has electronically readable control signals which are capable of interacting with a programmable computer system such that one of the methods described herein is performed.

In general, exemplary embodiments of the present invention may be implemented as a computer program product having a program code, wherein the program code is effective in performing one of the methods when the computer program product is executed on a computer.

By way of example, the program code may also be stored on a machine readable medium.

Other exemplary embodiments comprise the computer program for performing one of the methods described herein, wherein the computer program is stored on a machine readable medium.

In other words, one exemplary embodiment of the method according to the invention is therefore a computer program which has a program code for performing one of the methods described herein when the computer program is executed on a computer.

A further exemplary embodiment of the methods according to the invention is therefore a data storage medium (or a digital storage medium or a computer readable medium) on which the computer program for performing one of the methods described herein is recorded.

A further exemplary embodiment of the method according to the invention is therefore a data stream or a sequence of signals which represent(s) the computer program for performing one of the methods described herein. By way of example, the data stream or the sequence of signals may be configured to be transferred via a data communication link, for example via the Internet.

A further exemplary embodiment comprises a processing device, for example a computer or a programmable logic element, which is configured or customized to perform one of the methods described herein.

A further exemplary embodiment comprises a computer on which the computer program for performing one of the methods described herein is installed.

A further exemplary embodiment according to the invention comprises an apparatus or a system which is designed to transmit a computer program for performing at least one of the methods described herein to a receiver. By way of example, the transmission can take place electronically or optically. The receiver may be a computer, a mobile appliance, a memory appliance or a similar apparatus, for example. The apparatus or the system may comprise a file server for transmitting the computer program to the receiver, for example.

In some exemplary embodiments, a programmable logic element (for example a field programmable gate array, an FPGA) can be used to perform some or all functionalities of the methods described herein. In some exemplary embodiments, a field programmable gate array can interact with a microprocessor in order to perform one of the methods described herein. In general, the methods in some exemplary embodiments are performed by any hardware apparatus. This may be a universally usable piece of hardware such as a computer processor (CPU), or hardware which is specific to the method, such as an ASIC.

The exemplary embodiments described above are merely an illustration of the principles of the present invention. It goes without saying that modifications and variations to the arrangements and details described herein will become apparent to other persons skilled in the art. It is therefore intended that the invention be limited merely by the scope of protection of the patent claims which follow rather than by the specific details which have been presented herein using the description and the explanation of the exemplary embodiments.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for producing an instruction sequence for a computation unit which can be controlled by a program that comprises at least the instruction sequence, wherein, when the program is in runtime, signature values are calculated on the basis of the executed instructions and are compared with reference values, the method comprising:
   determining a target signature value;
   determining an initial instruction sequence for a program section leading to a program point, wherein the execution of the initial instruction sequence starting from a start signature value results in a calculation of an initial signature value for the target signature, the initial signature value being different than the target signature value; and
   determining a modification to the initial instruction sequence in order to obtain a modified instruction sequence, so that the execution of the modified instruction sequence results in a calculation of a signature value which corresponds to the target signature value, and a result of processing of useful data by the modified instruction sequence corresponds to a result of processing of the useful data by the initial instruction sequence at the program point, wherein all the instructions in the modified instruction sequence are used in the signature calculation using a same method,
   wherein determining the modification to the initial instruction sequence comprises one or more of:
      changing the order of two or more instructions;
      replacing an instruction;
      splitting an instruction into two or more instruction parts;
      comparing the difference with at least one signature modification value for at least one modification option, selecting a modification option, determining a residual difference and if the residual difference is not equal to zero, repeating the steps of comparing, selecting and determining the residual difference;
      identifying a splittable instruction in the program section, breaking down an argument from the splittable instruction into at least two argument parts and replacing the splittable instruction with at least two instruction parts, each having one of the at least two argument parts; and
      attempting to determine a modification which does not prompt an extension to the instruction sequence, wherein, if such a modification is not found, the method further comprises at least one of determining a modification which prompts an extension to the instruction sequence, inserting of an instruction for an explicit code update and changing the target signature value and/or of the initial signature.

2. The method as claimed in claim 1, wherein determining the modification to the initial instruction sequence further comprises inserting an instruction.

3. The method as claimed in claim 1, wherein determining the modification to the initial instruction sequence further comprises assigning a constant value to a register or a memory element in the computation unit without the constant value being used for processing the useful data following the assignment.

4. The method as claimed in claim 1, wherein determining the modification to the initial instruction sequence further comprises selecting a chosen modification option from a multiplicity of modification options, and wherein the instruction sequence modified according to the chosen modification option has lower additional processing complexity compared to the initial instruction sequence than other modification options.

5. The method as claimed in claim 4, wherein the selection of the chosen modification option comprises querying a database which stores modification specifications for the multiplicity of the modification options which can be used to ascertain the multiplicity of the modification options for the program section.

6. The method as claimed in claim 1, wherein determining the target signature value comprises ascertaining an instruction value for an alternative program path to the program point as compared with the program section.

7. A computer readable digital storage medium having stored thereon a computer program having a program code for performing, when miming on a computer, a method for producing an instruction sequence for a computation unit which can be controlled by a program that comprises at least the instruction sequence, wherein, when the program is in runtime, signature values are calculated on the basis of the executed instructions and are compared with reference values, the method comprising:

determining a target signature value;

determining an initial instruction sequence for a program section leading to a program point, wherein the execution of the initial instruction sequence starting from a start signature value results in a calculation of an initial signature value for the target signature, the initial signature value being different than the target signature value; and determining a modification to the initial instruction sequence in order to obtain a modified instruction sequence, so that the execution of the modified instruction sequence results in a calculation of a signature value which corresponds to the target signature value, and a result of processing of useful data by the modified instruction sequence corresponds to a result of processing of the useful data by the initial instruction sequence at the program point, wherein all the instructions in the modified instruction sequence are used in the signature calculation using a same method, wherein determining the modification to the initial instruction sequence comprises one or more of:

changing the order of two or more instructions;

replacing an instruction;

splitting an instruction into two or more instruction parts;

comparing the difference with at least one signature modification value for at least one modification option, selecting a modification option, determining a residual difference and if the residual difference is not equal to zero, repeating the steps of comparing, selecting and determining the residual difference;

identifying a splittable instruction in the program section, breaking down an argument from the splittable instruction into at least two argument parts and replacing the splittable instruction with at least two instruction parts, each having one of the at least two argument parts; and attempting to determine a modification which does not prompt an extension to the instruction sequence, wherein, if such a modification is not found, the method further comprises at least one of determining a modification which prompts an extension to the instruction sequence, inserting of an instruction for an explicit code update and changing the target signature value and/or of the initial signature.

8. An apparatus for producing an instruction sequence for a computation unit which can be controlled by a program which comprises at least the instruction sequence, wherein, when the program is in runtime, signature values are calculated on the basis of the executed instructions and are compared with reference values, the apparatus comprising:

a target signature determination unit configured to determine a target signature value;

an instruction sequence determination unit configured to determine an initial instruction sequence for a program section leading to a program point;

a signature ascertainment unit configured to ascertain an initial signature value associated with the program point and based on the initial instruction sequence, the initial signature value being different than the target signature value; and a modification determination unit configured to determine a modification to the initial instruction sequence in order to obtain a modified instruction sequence, so that the execution of the modified instruction sequence results in a calculation of the target signature value, and a result of processing of useful data by the modified instruction sequence corresponds to a result of processing of the useful data by the initial instruction sequence at the program point, wherein all the instructions in the modified instruction sequence are used in the signature calculation using a same method, wherein the modification determination unit is configured to determine the modification to the initial instruction sequence by one or more of:

changing the order of two or more instructions;

replacing an instruction;

splitting an instruction into two or more instruction parts;

comparing the difference with at least one signature modification value for at least one modification option, selecting a modification option, determining a residual difference and if the residual difference is not equal to zero, repeating the steps of comparing, selecting and determining the residual difference;

identifying a splittable instruction in the program section, breaking down an argument from the splittable instruction into at least two argument parts and replacing the splittable instruction with at least two instruction parts, each having one of the at least two argument parts; and attempting to determine a modification which does not prompt an extension to the instruction sequence, wherein, if such a modification is not found, the method further comprises at least one of determining a modification which prompts an extension to the instruction sequence, inserting of an instruction for an explicit code update and changing the target signature value and/or of the initial signature.

9. The apparatus as claimed in claim 8, wherein the modification determination unit is configured to determine the modification to the initial instruction sequence by also inserting an instruction.

10. The apparatus as claimed in claim 8, wherein the modification determination unit is configured to determine the modification to the initial instruction sequence by also assigning a constant value to a register or a memory element in the computation unit without the constant value being used for processing the useful data following the assignment.

11. A method for producing an instruction sequence for a computation unit which can be controlled by a program that comprises at least the instruction sequence, wherein, when the program is in runtime, signature values are calculated on the basis of the executed instructions and are compared with reference values, the method comprising:

determining a target signature value;

determining an initial instruction sequence for a program section leading to a program point, wherein the execution of the initial instruction sequence starting from a start signature value results in a calculation of an initial signature value for the target signature, the initial signature value being different than the target signature value; and determining a modification to the initial instruction sequence in order to obtain a modified instruction sequence, so that the execution of the modified instruction sequence results in a calculation of a signature value which corresponds to the target signature value, and a result of processing of useful data by the modified instruction sequence corresponds to a result of processing of the useful data by the initial instruction sequence at the program point, wherein all the instructions in the modified instruction sequence are used in the signature calculation using a same method, wherein determining the target signature value comprises ascertaining an instruction value for an alternative program path to the program point as compared with the program section.

\* \* \* \* \*

UNITED STATES PATENT AND TRADEMARK OFFICE
CERTIFICATE OF CORRECTION

PATENT NO. : 9,323,604 B2
APPLICATION NO. : 13/428589
DATED : April 26, 2016
INVENTOR(S) : B. Gammel et al.

It is certified that error appears in the above-identified patent and that said Letters Patent is hereby corrected as shown below:

Claims
Column 15, line 3 (claim 7, line 3) please change "when miming" to -- when running --

Signed and Sealed this
Twenty-sixth Day of July, 2016

Michelle K. Lee
*Director of the United States Patent and Trademark Office*